United States Patent
Richter et al.

[11] 3,891,687
[45] June 24, 1975

[54] 2-ALKOXY 3,5-DIHALO-BENZALDOXIMES

[75] Inventors: Sidney B. Richter; Eugene F. Barnas, both of Chicago, Ill.

[73] Assignee: Velsicol Chemical Corporation, Chicago, Ill.

[22] Filed: Oct. 19, 1970

[21] Appl. No.: 82,181

Related U.S. Application Data

[62] Division of Ser. No. 779,247, Nov. 26, 1968, Pat. No. 3,597,467.

[52] U.S. Cl. .............................. 260/453 R; 424/298
[51] Int. Cl.² ........................................ C07C 119/18
[58] Field of Search .................. 260/453 R; 424/324

[56] References Cited
UNITED STATES PATENTS

| | | | |
|---|---|---|---|
| 3,187,042 | 6/1965 | Richter | 260/453 R |
| 3,236,871 | 2/1966 | Hinman et al. | 424/324 |
| 3,278,652 | 10/1966 | Barnas et al. | 260/453 R |
| 3,352,899 | 11/1967 | Taniguchi et al. | 260/453 R |
| 3,439,018 | 4/1969 | Brookes et al | 260/453 R |
| 3,485,865 | 12/1969 | Richter et al. | 260/453 R |
| 3,629,456 | 12/1971 | Urbschat et al. | 424/324 |

Primary Examiner—Glennon H. Hollrah
Attorney, Agent, or Firm—Robert J. Schwarz; Dietmar H. Olesch

[57] ABSTRACT

This invention discloses new chemical compositions of matter and more particularly new compounds selected from the group consisting of

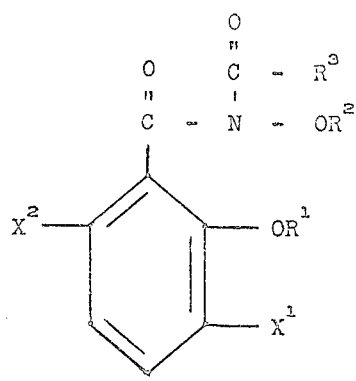

and their isomeric form

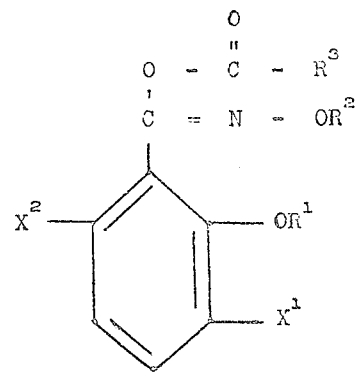

wherein $X^1$ and $X^2$ are halogen; $R^1$ and $R^2$ are alkyl; and $R^3$ is selected from the group consisting of alkyl, alkenyl, alkoxy and alkylthio. The compounds of the above description are useful as acaricides.

1 Claim, No Drawings

2-ALKOXY 3,5-DIHALO-BENZALDOXIMES

This application is a divisional of our co-pending application Ser. No. 779,247 filed Nov. 26, 1968, now U.S. Pat. No. 3,597,467 issue date Aug. 3, 1971.

This invention relates to new compositions of matter and more particularly relates to new chemical compounds selected from the group consisting of compounds of the formula

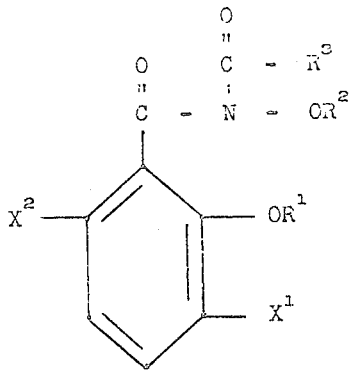

and their isomeric form

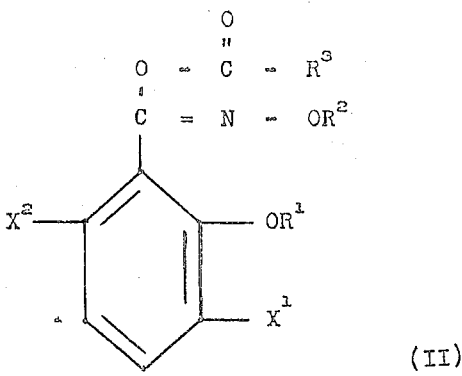

wherein $X^1$ and $X^2$ are halogen; $R^1$ and $R^2$ are alkyl; and $R^3$ is selected from the group consisting of alkyl, alkenyl, alkoxy and alkylthio.

In a preferred embodiment of this invention $X^1$ and $X^2$ are selected from the group consisting of chlorine and bromine; $R^1$ and $R^2$ are lower alkyl; and $R^3$ is selected from the group consisting of lower alkyl, lower alkenyl, lower alkoxy and lower alkylthio. The term lower as used herein designates a straight or branched carbon chain of up to about 10 carbon atoms.

The compounds of the present invention are unexpectedly useful as acaricides.

The compounds of this invention can be readily prepared from an N-alkoxybenzamide of the following general formula

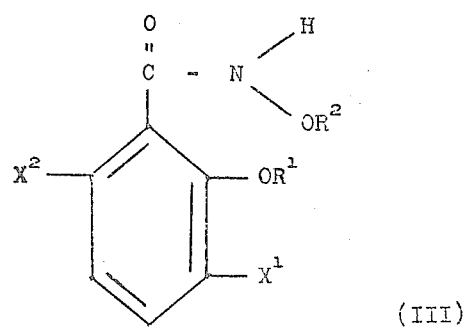

wherein $X^1$, $X^2$, $R^1$ and $R^2$ are as heretofore described, by reaction with a chloroformate or acid chloride of the formula

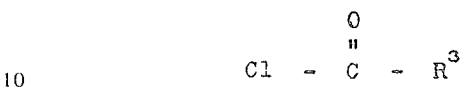

wherein $R^3$ is as heretofore described. This reaction can be readily effected in an inert organic reaction medium such as benzene by refluxing the reactants for a period of from about 1 to about 18 hours in the presence of an acid acceptor such as a tertiary amine. The reaction product can then be recovered by first filtering the reaction mixture to remove the acid acceptor chloride which has formed, and thereafter evaporating the solvent from the filtrate to yield a mixture of the isomeric forms of the compounds of this invention. This mixture of isomers can be used as such for preparing valuable acaricidal compositions or can be separated into the individual isomers. The separation of the isomeric mixture into its two components can be effected by subjecting the product to chromatography. A suitable adsorbent for this purpose is, for example, fullers' earth, while suitable eluents are pentane and pentane-ether mixtures.

Exemplary chloroformates and acid chlorides for preparing the compounds of the present invention are methyl chloroformate, ethyl chloroformate, n-propyl chloroformate, isopropyl chloroformate, t-butyl chloroformate, n-hexyl chloroformate, methyl thiolochloroformate, ethyl thiolochloroformate, acetyl chloride, propanoyl chloride, n-butanoyl chloride, sec-butanoyl chloride, n-hexanoyl chloride, acryloyl chloride, methacryloyl chloride, 4-pentenoyl chloride, and the like.

The N-alkoxybenzamides of Formula III can be readily prepared from the corresponding benzoyl chloride by reaction with an appropriately substituted amine or amine hydrochloride. To effect this reaction the substituted benzoyl chloride can be added, with cooling, to a mixture of the amine or amine hydrochloride and an aqueous solution of a base such as an alkali metal hydroxide or carbonate. It is preferred to utilize an organic solvent such as chloroform or benzene in the reaction mixture. After the addition is completed the reaction can be continued by stirring for a period of about ½ to about 8 hours. In some instances refluxing of the reaction mixture can be desirable to ensure the completion of the reaction.

The reaction product can then be isolated from the reaction mixture by separating the aqueous and organic phases, drying and filtering the organic phase, and distilling or evaporating the solvent therefrom if the reaction product is soluble in the solvent or by filtering the reaction mixture if the reaction product is insoluble in the solvent. The product can then be used as such or can be further purified by recrystallization or other common techniques in the art.

The benzoyl chlorides when not readily available can be prepared from the corresponding benzoic acids by common techniques such as reaction with thionyl chloride or phosphorus pentachloride.

The manner in which the compounds of the present invention can be prepared readily is illustrated in the following examples.

EXAMPLE 1

Preparation of N,2-Dimethoxy-3,6-dichlorobenzamide

Methoxyamine hydrochloride (12.8 grams), a solution of sodium hydroxide (12 grams) in water (100 ml) and chloroform (200 ml) were charged into a glass reaction flask equipped with a mechanical stirrer. 2-Methoxy-3,6-dichlorobenzoyl chloride (36 grams) was slowly added to the flask with stirring and cooling. After the addition was completed, stirring was continued for a period of several hours. After this time the organic phase was separated from the aqueous phase and was dried and filtered. The filtered organic phase was then evaporated and the resulting solid residue recrystallized from a chloroform-pentane mixture to yield the desired product N,2-dimethoxy-3,6-dichlorobenzamide.

EXAMPLE 2

Preparation of N,2-Dimethoxy-N-ethylthiocarbonyl-3,6-dichlorobenzamide and O-Methyl-α-ethylthiocarbonyloxy-2-methoxy-3,6-dichlorobenzaldoxime N,2-Dimethoxy-3,6-dichlorobenzamide (7 grams), ethyl thiolochloroformate (5 grams), pyridine and benzene (250 ml) were charged into a glass reaction flask equipped with stirrer, thermometer and reflux condenser. The reaction mixture was heated at reflux for a period of about 5 hours. After this time the mixture was cooled to room temperature and filtered. The filtrate was stripped of benzene leaving a viscous oily residue. The residue was dissolved in ether and washed with water and aqueous potassium carbonate and the washed solution was dried over magnesium sulfate and filtered. The filtrate was then stripped of ether to yield a mixture of the isomers N,2-dimethoxy-N-ethylthiocarbonyl-3,6-dichlorobenzamide (mp 71° to 74°C) and O-methyl-α-ethylthiocarbonyloxy-2-methoxy-3,6-dichlorobenzaldoxime.

EXAMPLE 3

Preparation of N,2-Dimethoxy-N-ethoxycarbonyl-3,6-dichlorobenzamide

N,2-Dimethoxy-3,6-dichlorobenzamide (7 grams), ethyl chloroformate (3.3 grams), pyridine (3.5 grams) and benzene (250 ml) were charged into a glass reaction flask equipped with stirrer, thermometer and reflux condenser. The reaction mixture was heated, with stirring, at reflux overnight. The reaction mixture was then cooled to room temperature and was washed with water. The organic phase was separated from the aqueous phase, washed with aqueous potassium carbonate, dried over magnesium sulfate and filtered. The filtrate was evaporated and the resulting oily residue was subjected to chromatography to yield the desired product N,2-dimethoxy-N-ethoxycarbonyl-3,6-dichlorobenzamide.

EXAMPLE 4

Preparation of N,2-Dimethoxy-N-isopropoxycarbonyl-3,6-dichlorobenzamide

N,2-Dimethoxy-3,6-dichlorobenzamide (6.3 grams), isopropyl chloroformate (3.1 grams), pyridine (2.1 grams) and benzene (200 ml) were charged into a glass reaction flask equipped with stirrer, thermometer and reflux condenser. The reaction mixture was heated, with stirring, at reflux overnight. The reaction mixture was then cooled to room temperature and was washed first with water and then with aqueous sodium carbonate. The organic phase was then separated from the aqueous phase, was dried over anhydrous magnesium sulfate and filtered. The filtrate was evaporated leaving an oil as the residue. The residue was subjected to chromatography using fullers' earth as the absorbent and pentane-ether mixtures as the eluent to yield the desired product N,2-dimethoxy-N-isopropoxycarbonyl-3,6-dichlorobenzamide.

EXAMPLE 5

Preparation of N,2-Dimethoxy-N-acetyl-3,6-dichlorobenzamide

N,2-Dimethoxy-3,6-dichlorobenzamide (5.0 grams; 0.02 mol) and a solution of potassium hydroxide (1.3 grams) in absolute ethanol (50 ml) were charged into a glass reaction flask equipped with stirrer, thermometer and reflux condenser. The mixture was heated at reflux for a period of about 30 minutes. The reaction mixture was then stripped of ethanol and benzene (20 ml) and a solution of acetyl chloride (3.0 grams) in benzene (30 ml) was added thereto. The reaction mixture was then heated at reflux, with stirring, for a period of about 3 hours. After this time the reduction mixture was cooled to room temperature and filtered. The filtrate was stripped of solvent to yield a solid residue. The residue was dissolved in ether and the ether solution was washed with aqueous potassium carbonate. The washed solution was dried over magnesium sulfate and filtered. The filtrate was evaporated under aspirator pressure and the resulting residue was recrystallized from a chloroformpentane mixture to yield the desired product N,2-dimethoxy-N-acetyl-3,6-dichlorobenzamide.

EXAMPLE 6

Preparation of N,2-Diethoxy-N-n-propoxycarbonyl-3,6-dichlorobenzamide and O-Ethyl-α-n-propoxycarbonyloxy-2-ethoxy-3,6-dichlorobenzaldoxime N,2-Diethoxy-3,6-dichlorobenzamide (13.9 grams; 0.05 mol), n-propyl chloroformate (7.9 grams; 0.05 mol), pyridine (10 grams) and benzene (350 ml) are charged into a glass reaction vessel equipped with a mechanical stirrer, thermometer and reflux condenser. The reaction mixture is heated at reflux for a period of about 6 hours. After this time the reaction mixture is cooled to room temperature and filtered. The filtrate is washed first with water and then with aqueous potassium carbonate and is dried over anhydrous magnesium sulfate. The dried solution is then stripped of solvent and the resulting residue is chromatographed using fullers' earth as the adsorbent and pentane-ether mixtures as the eluent to yield the desired products, N,2-diethoxy-N-n-propoxycarbonyl-3,6-dichlorobenzamide and O-ethyl-α-n-propoxycarbonyloxy-2-ethoxy-3,6-dichlorobenzaldoxime.

EXAMPLE 7

Preparation of N-Methoxy-N-n-butanoyl-2-ethoxy-3,6-dichlorobenzamide and O-Methyl-α-n-butanoyloxy-2-ethoxy-3,6-dichlorobenzaldoxime N-Methoxy-2-ethoxy-3,6-dichlorobenzamide (13.2 grams; 0.05 mol), n-butanoyl chloride (6.0 grams; 0.05 mol), pyridine (10 grams) and benzene (350 ml) are charged into a glass reaction vessel equipped with a mechanical stirrer, thermometer and reflux condenser. The reaction mixture is heated at reflux for a period of about 8 hours. After this time the mixture is cooled to room temperature and filtered. The filtrate is washed first with water and then with aqueous sodium carbonate and is dried over anhydrous magnesium sulfate. The dried solution is stripped of solvent and the resulting residue is chromatographed using fullers' earth as the adsorbent and pentane-ether mixtures as the eluent to yield the desired products, N-methoxy-N-n-butanoyl-2-ethoxy-3,6-dichlorobenzamide and O-methyl-α-n-butanoyloxy-2-ethoxy-3,6-dichlorobenzaldoxime.

Additional compounds within the scope of the present invention can be prepared by the procedures described in the foregoing examples. Presented in the following examples are the essential ingredients required to prepare the indicated named compounds according to the procedures heretofore described.

EXAMPLE 8

2-n-Butoxy-3,6-dibromobenzoyl chloride + isopropoxyamine + methyl chlorothioloformate = N-isopropoxy-N-methylthiocarbonyl-2-n-butoxy-3,6-dibromobenzamide + O-isopropyl-α-methylthiocarbonyloxy-2-n-butoxy-3,6-dibromobenzaldoxime.

EXAMPLE 9

2-n-Propoxy-3,6-diiodobenzoyl chloride + pentyloxyamine + acryloyl chloride = N-pentyloxy-N-acryloyl-2-n-propoxy-3,6-diiodobenzamide + O-pentyl-α-acryloyloxy-2-n-propoxy-3,6-diiodobenzaldoxime.

EXAMPLE 10

2-Methoxy-3,6-dichlorobenzoyl chloride + decyloxyamine + propanoyl chloride = N-decyloxy-N-propanoyl-2-methoxy-3,6-dichlorobenzamide + O-decyl-α-propanoyl-2-methoxy-3,6-dichlorobenzaldoxime.

EXAMPLE 11

2-Decyloxy-3,6-difluorobenzoyl chloride +methoxyamine + methyl chloroformate = N-methoxy-N-methoxycarbonyl-2-decyloxy-3,6-difluorobenzamide + O-methyl-α-methoxycarbonyloxy-2-decyloxy-3,6-difluorobenzaldoxime.

EXAMPLE 12

2-Ethoxy-3,6-dibromobenzoyl chloride + methoxyamine + octanoyl chloride = N-methoxy-N-octanoyl-2-ethoxy-3,6-dibromobenzamide + O-methyl-αoctanoyloxy-2-ethoxy-3,6-dibromobenzaldoxime.

EXAMPLE 13

2-Methoxy-3,6-dichlorobenzoyl chloride + methoxyamino + decyl chloroformate = N,2-dimethoxy-N-decyloxycarbonyl-3,6-dichlorobenzamide + O-methyl-α-decyloxycarbonyloxy-2-methoxy-3,6-dichlorobenzaldoxime.

Many economically important species of mites and ticks can be controlled by the compounds of the present invention such as the red spider mite, the two-spotted spider mite, the strawberry spider mite, the citrus rust mite, the cattle tick, the poultry mite, the citrus red mite and the European red mite.

For practical use as acaricides, the compounds of this invention are generally incorporated into acaricidal compositions which comprise an inert carrier and an acaricidally toxic amount of such a compound. Such acaricidal compositions, which can also be called formulations, enable the active compound to be applied conveniently to the site of the acarid infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of acaricides can be dispersed under superatmospheric pressure as aerosols. However, preferred liquid acaricidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the acarid infestation. The emulsifiers most commonly used in these concentrates are nonionic or mixtures of nonionic with anionic surface-active agents.

A typical acaricidal composition according to this invention is illustrated by the following example, in which the quantities are in parts by weight.

EXAMPLE 14

Preparation of a Dust

| | |
|---|---|
| Product of Example 2 | 10 |
| Powdered Talc | 90 |

The above ingredients are mixed in a mechanical grinder-blender and are ground until a homogeneous, freeflowing dust of the desired particle size is obtained. This dust is suitable for direct application to the site of the acarid infestation.

The compounds of this invention can be applied as acaricides in any manner recognized by the art. One method for destroying acarids comprises applying to the locus of the acarid infestation, an acaricidal composition comprising an inert carrier and, as an essential active ingredient, in a quantity which is toxic to said acarids, a compound of the present invention. The concentration of the new compounds of this invention in the acaricidal compositions will vary greatly with the type of formulation and the purpose for which it is designed, but generally the acaricidal compositions will comprise from about 0.05 to about 95 percent by weight of the active compounds of this invention. In a preferred embodiment of this invention, the acaricidal compositions will comprise from about 5 to 75 percent by weight of the active compound. The compositions can also comprise such additional substances as other pesticides, stabilizers, spreaders, deactivators, adhesives, stickers, fertilizers, activators, synergists, and the like.

The compounds of the present invention are also useful when combined with insecticides in the compositions heretofore described. These insecticides can comprise from about 5% to about 95% of the active ingredients in the compositions. Use of the combinations of these insecticides with the compounds of the present invention provide insecticidal and acaricidal compositions which are more effective in controlling insects and acarids and often provide results unattainable with separate compositions of the individual compounds. The insecticides with which the compounds of this invention can be used in the acaricidal compositions to control insects as well as acarids include halogenated compounds such as DDT, methoxychlor, TDE, lindane, chlordane, isobenzan, aldrin, dieldrin, heptachlor, endrin, mirex, endosulfon, dicofol, and the like; organic phosphorus compounds such as TEPP, schradan, ethion, parathion, methyl parathion, EPN, demeton, carbophenothion, phorate, zinophos, diazinon, malathion, mevinphos, dimethoate, DBD, ronnel, oxydemetonmethyl, dicapthon, chlorothion, phosphamidon, naled, fenthion, trichlorofon, DDVP, and the like; organic nitrogen compounds such as dinitro-o-cresol, dinitrocyclohexylphenol, DNB, DNP, binapacril, azobenzene, and the like; organic carbamate compounds such as carbaryl, ortho 5353, and the like; organic sulfur compounds such as phenothiazine, phenoxathin, lauryl thiocyanate, [bis(2-thiocyanoethyl)ether], isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradichlorobenzene, and the like.

The compounds of the present invention can also be combined with fungicidal and nematocidal chemical compounds to form pesticidal compositions useful for the control of fungi and in some cases soil nematodes as well as acarids. Typical examples of such fungicidal chemical compounds are ferbam, nabam, zineb, ziram, thiram, chloranil, dichlone, glyodin, cycloheximide, dinocap, maneb, captan, dodine, PCNB, p-dimethylaminobenzenediazo sodium sulfonate, and the like; while examples of nematocidal compounds are chloropicrin, O,O-diethyl O-(2,4-dichlorophenyl) phosphorothioate, tetrachlorothiophene, dazomet, dibromochloropropane, and the like.

The new compounds of this invention can be used in many ways for the control of acarids. Acaricides which are to be used as stomach poisons or protective materials can be applied to the surface on which the acarids feed or travel. Acaricides which are to be used as contact poisons or eradicants can be applied directly to the body of the acarid, as a residual treatment to the surface on which the acarid may walk or crawl, or as a fumigant treatment of the air which the acarid breathes. In some cases, the compounds applied to the soil or plant surfaces are taken up by the plant, and the acarids are poisoned systemically.

The quantity of active compound of this invention to be used for acarid control will depend on a variety of factors, such as the specific acarid involved, intensity of the infestation, weather, type of environment, type of formulation, and the like. For example, the application of only one or two ounces of active chemical per acre may be adequate for control of a light infestation of an acarid under conditions unfavorable for its feeding, while a pound or more of active compound per acre may be required for the control of a heavy infestation of acarids under conditions favorable to their development.

The acaricidal activity of the compounds of the present invention was demonstrated in experiments carried out for the control of the two-spotted spider mite (*Tetranychus urticae*).

In one experiment wherein the activity of the compounds of the present invention as contact poisons was determined, the test compounds were formulated at the indicated dosages, as aqueous emulsions of acetone solutions and were sprayed onto Henderson bush lima bean plants, each infested with about 100 adult two-spotted spider mites. The treated plants were then placed into a holding room and were supplied with their daily requirement of water and light. After a period of 5 days the mortality of the mites is determined and is rated on a percentage basis in comparison to untreated controls. The results of this experiment are shown in Table I.

TABLE I

| Test Compound | Concentration of Test Compound in ppm | % Mortality |
| --- | --- | --- |
| N,2-Dimethoxy-N-ethylthiocarbonyl-3,6-dichlorobenzamide | 3500 | 94 |
| " | 1000 | 89 |
| N,2-Dimethoxy-N-ethoxycarbonyl-3,6-dichlorobenzamide | 3500 | 97 |
| " | 1000 | 100 |
| N,2-Dimethoxy-N-isopropoxycarbonyl-3,6-dichlorobenzamide | 3500 | 100 |
| " | 1000 | 91 |

We claim:
1.

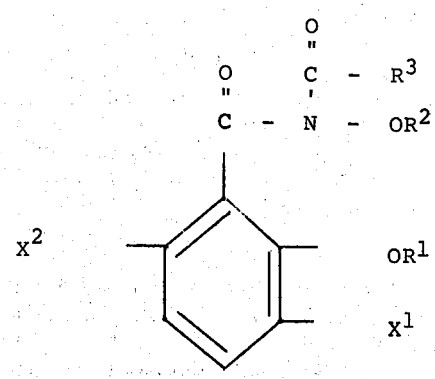

wherein $X^1$ and $X^2$ are halogen; $R^1$ and $R^2$ are lower alkyl; and $R^3$ is lower alkyl.

* * * * *

UNITED STATES PATENT OFFICE
CERTIFICATE OF CORRECTION

PATENT NO. : 3,891,687
DATED : June 24, 1975
INVENTOR(S) : Sidney B. Richter and Eugene F. Barnas It is certified that error appears in the above-identified patent and that said Letters Patent are hereby corrected as shown below:

In the title, both in the heading and column 1, line 1,
for "3,5-DIHALO-BENZALDOXIMES" read
-- 3,6-DIHALO-BENZALDOXIMES --.

Signed and Sealed this fourth Day of November 1975

[SEAL]

Attest:

RUTH C. MASON
*Attesting Officer*

C. MARSHALL DANN
*Commissioner of Patents and Trademarks*